(12) United States Patent
Ebihara

(10) Patent No.: US 7,159,396 B2
(45) Date of Patent: Jan. 9, 2007

(54) FLUID-OPERATED POWER GENERATING SYSTEM

(76) Inventor: Daniel T. Ebihara, 91 Grand St., New York, NY (US) 10013

( * ) Notice: Subject to any disclaimer, the term of this patent is extended or adjusted under 35 U.S.C. 154(b) by 152 days.

(21) Appl. No.: 10/881,916

(22) Filed: Jun. 30, 2004

(65) Prior Publication Data

US 2006/0000210 A1    Jan. 5, 2006

(51) Int. Cl.
*F03C 1/00*    (2006.01)
(52) U.S. Cl. ............................. 60/495; 60/597; 60/501
(58) Field of Classification Search .................. 60/473, 60/495, 497, 501, 639
See application file for complete search history.

(56) References Cited

U.S. PATENT DOCUMENTS

| | | | |
|---|---|---|---|
| 2,747,605 A | 5/1956 | Adams | 73/322.5 |
| 4,083,186 A * | 4/1978 | Jackson, Sr. | 60/495 |
| 4,267,695 A * | 5/1981 | Micciche | 60/495 |
| 4,324,099 A * | 4/1982 | Palomer | 60/495 |
| 4,674,281 A | 6/1987 | Kim et al. | 60/503 |
| 4,838,025 A * | 6/1989 | Nelis | 60/639 |

FOREIGN PATENT DOCUMENTS

| | | |
|---|---|---|
| AU | 1443483 A | 11/1984 |
| DE | 566655 C | 12/1932 |
| GB | 2332480 A | 6/1999 |

OTHER PUBLICATIONS

Patent Abstracts of Japan, vol. 006, No. 045 (M-118), Mar. 20, 1982 (Morita Noboru) Dec. 8, 1981 abstract of JP 56 159571.
Angrist S.W. : "Perpetual Motin Machines" Scientific American, Scientific American Inc. vol. 218, No. 1, Jan. 1, 1968, pp. 114-122, XP002036811 ISSN: 0036-8733.

* cited by examiner

Primary Examiner—Hoang Nguyen
(74) Attorney, Agent, or Firm—Dilworth & Barrese, LLP

(57) ABSTRACT

A system and method for actuating a load by means of the conversion of hydraulic energy to reciprocating movement of a piston assembly within a chamber. The piston assembly includes a float, and the fluid within the chamber is alternately withdrawn into fluid conveying pipes or channels and returned to the chamber under the influence of gravity.

22 Claims, 3 Drawing Sheets

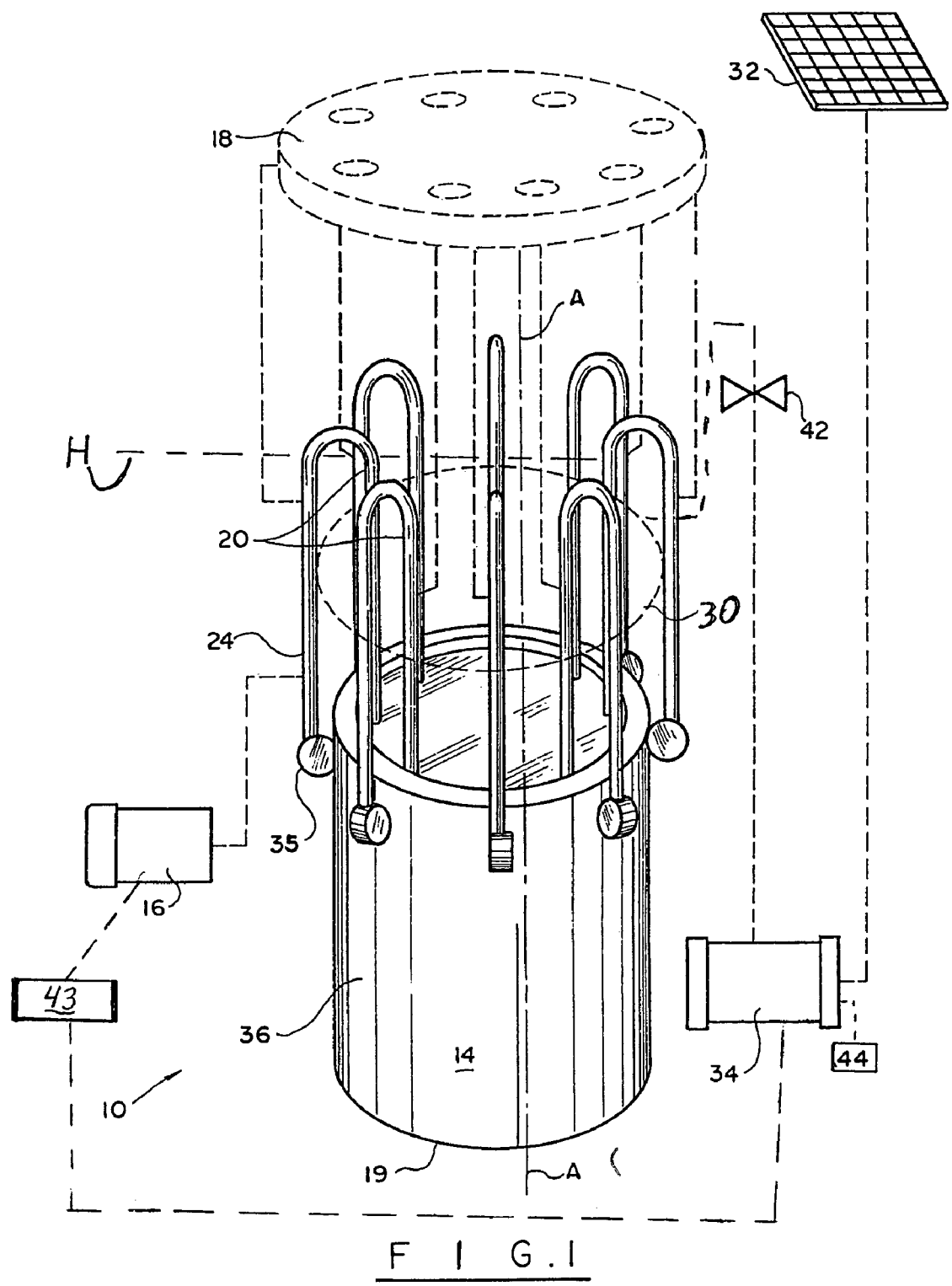
F I G . I

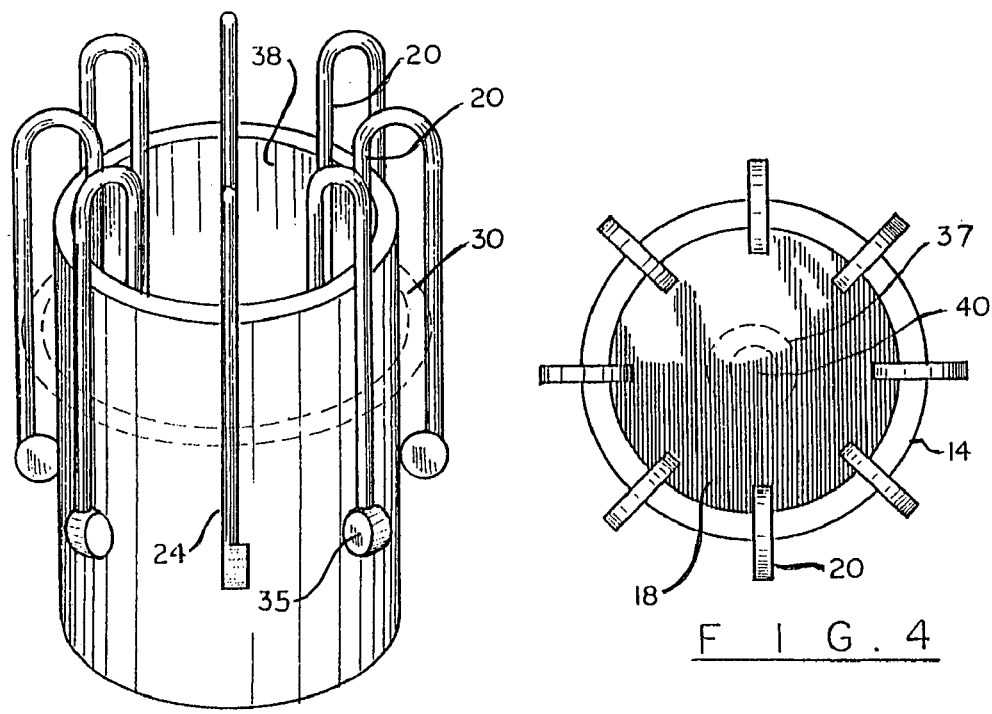
FIG. 3
FIG. 4
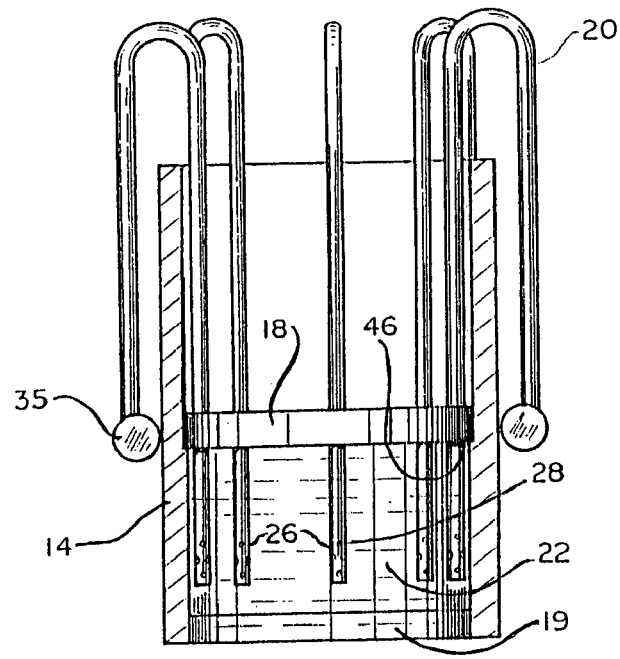
FIG. 2

FLUID-OPERATED POWER GENERATING SYSTEM

BACKGROUND OF THE INVENTION

1. Field of the Invention

This invention relates to a fluid-operated system and method for generating mechanical energy to operate a load.

2. Discussion of the Related Prior Art

One of the most sought after goals in the field of energy conversion is the efficient transfer of mechanical energy to other usable forms of energy, such as heat energy, nuclear and electrical energy. To date, the conversion of mechanical energy to electrical energy has only been accomplished in situations where cost effectiveness is not a primary consideration, such as power plants.

It would therefore be desirable to reduce the cost of an energy converting power system by simplifying the design and increasing the economy of manufacture and thus the subsequent utilization of such systems.

SUMMARY OF THE INVENTION

This objective is attained by the inventive system, in which periodic rise and fall of fluid level causes reciprocal displacement of a float coupled to and actuating a load. The load is configured to perform work or to convert a mechanical energy produced by the float into the same or different type of energy.

In accordance with one aspect of the invention, the inventive system includes a housing having a bottom, an actuator suspended in the housing and coupled to the load, and a fluid-supply assembly selectively delivering fluid into the housing between the actuator and the bottom of the housing and evacuating the fluid therefrom. As a result, the actuator is reciprocally movable in the housing away from and towards the bottom thereof, and since the load is displaceably fixed with the float, it moves synchronously with the float.

Selecting the load from a variety of energy converters allows the inventive system to be a very efficient, cost-effective and easy to assemble and maintain energy generating means. Among numerous applications of the inventive system, its utilization as an economical, local electrical generator perhaps is the most obvious.

In accordance with another aspect of the invention, a method of utilizing mechanical energy includes reciprocally displacing a float in a housing in response to controllably supplying and evacuating fluid along a substantially closed fluid path. As a consequence, the float displaces a load fixed thereto and capable of converting the mechanical energy generated by the float into the same or different type of energy.

BRIEF DESCRIPTION OF THE DRAWINGS

The above and other objects, features and advantages will become more readily apparent from the following detailed description accompanied by the drawings, in which:

FIG. 1 is a partially exploded view of the inventive system filled with fluid;

FIG. 2 is a sectional view of the inventive system taken along a longitudinal axis A—A shown in FIG. 1;

FIG. 3 is an elevational view of the inventive system upon evacuating fluid therefrom;

FIG. 4 is a top view of the inventive system; and

DETAILED DESCRIPTION OF THE PREFERRED EMBODIMENT(S)

Figure 5:
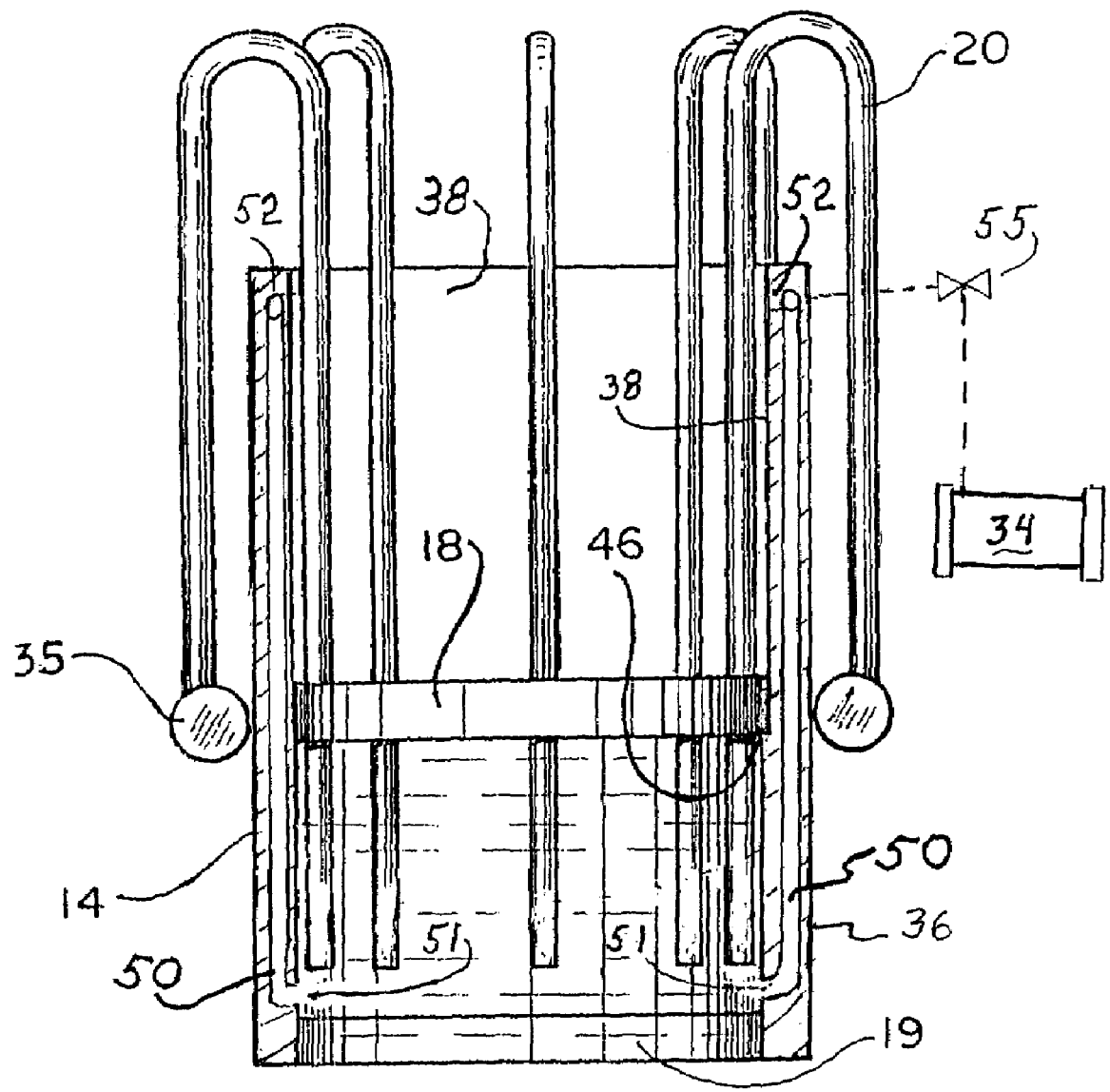
FIG. 5 illustrates an alternative embodiment of the system.

Referring to FIGS. 1–4, a hydraulically or pneumatically powered system 10 is configured to utilize mechanical energy of a reciprocally movable actuator to power a load 16 (FIG. 1), which includes any system for performing work or converting one form of energy to another such as machinery, electrical generators, heaters, and the like. The actuator includes at least one pipe 20, and a buoyant piston, i.e., float 18 (FIG. 1) which is made from material having a specific gravity lower than fluid 22 (FIG. 2) for supporting the float 18. The housing includes an interior surface 38 defining a chamber for containing a quantity of fluid which supports the float 18. The float 18 is reciprocatingly movable within the chamber in a vertical direction. As the level of the fluid 22 rises and lowers in the chamber of housing 14 (FIG. 1, 2) the float 18 moves between an upper position (FIG. 1) defined by a relatively large distance from a bottom 19 of a housing 14 and a lower position (FIGS. 2, 3). The float 18 can be made from various materials subject only to its ability to float. For example, various types of polymeric material or wood can be effectively implemented.

To provide the float 18 with stability as it moves up and down within the housing 14 (FIGS. 1, 2), its outer peripheral surface is shaped complementary to and dimensioned to be slightly smaller than an inner surface 38 (FIG. 3) of the housing 14. In addition, the top of the float 18 may be provided with a metal layer (not shown) to provide ballast. A further optional structural configuration for providing stability to the orientation of the float 18 includes a post 40 (FIG. 4) extending along the housing's axis of symmetry A—A (FIG. 1) and slidable within a central opening 37 of the float 18. The opening 37 is dimensioned to be only slightly larger than the outer diameter of the post 40 to provide guided movement of the float 18 and minimal loss of fluid as float 18 moves up and down. Uniformly spaced pipes 20 are preferably U-shaped and have first end regions 24 with guide rollers 35 in rolling contact with exterior surface 36 of the housing 14 to facilitate reciprocating sliding movement of the pipes 20. Rollers 35 help to stabilize the float 18.

The fluid 22 (FIG. 2) is preferably an incompressible liquid such as water, oil, and the like. However, the inventive system may be further modified to utilize gaseous medium provided, of course, that the system is hermetically sealed.

To provide displacement of fluid volume, in accordance with one embodiment of the inventive structure, the pump 34 is initially energized so that a predetermined volume of fluid is drawn into pipes 20 through respective openings 26 (FIG. 2), filling them at the desired height level H (FIG. 1). Accordingly, as the fluid level lowers in the housing 14, pipes 20 are displaced downwards to a position shown in FIG. 3 and actuate a load 16, such as an electrical generator or other type of machinery coupled to the pipes. Electrical generators for converting mechanical energy of linearly displaceable pipes 20 into electrical energy are known. After de-energizing the pump 34, the entire system 10 achieves a pressure-balanced state. To affect pressure differential, either a plurality of valves, each valve associated with a respective one of the pipes 20, or a common valve 42 located upstream from the height level H of the stored fluid volume, are opened thereby allowing air to enter the upper portions of the pipes 20 and causing the stored fluid volume to return under the influence of gravity into the housing 14, and thereby lifting the pipes 20 up to the height level H. As a result, the load 16 is again actuated to complete a cycle.

Theoretically, the pipes 20 and the housing 14 are large enough to displace the desired volume of fluid sufficient to charge an internal source of electricity, such as a battery 43 (FIG. 1), which is coupled to the load 16 so that it is capable of powering the pump 34 for subsequent cycles. If a single cycle of the pipes' displacement defined by a downward and upward stroke of the float 18 is not sufficient, the pump 34 may be controllably powered by an external source of energy 32 until the battery 43 is adequately charged. External energy source 32 can be, for example, a solar cell panel, battery, electrical generator, or any other source of energy. The valve 42 can be an electrically controlled valve or a simple flap opening in response to the predetermined pressure built up within the pipes 20 as the fluid fills them. To install the single valve 42, regions of the pipes 20 located somewhat downstream from the height level H of fluid (FIG. 1) are in air communication with one another, for example, through a toroidal tube serving as a closed air path 30. Alternatively, each upstream end of the pipes 20 may have a respective valve 42.

In accordance with a further aspect of the invention, the pump 34 is reversible and constantly powered by external energy source 32 (FIG. 1). As the pump rotates in one direction, the float 18 and the pipes 20 move linearly toward the housing's bottom 19 displacing the load 16, and upon reversing the rotational direction of the pump 34, the float 18, pipes 20 and load 16 are displaced in the opposite linear direction. Operation of the valve 42 and pump 34 are preferably controlled by a central processing unit 44 (FIG. 1).

Referring to FIG. 5, in an alternative embodiment of the invention, the pipes 20 may be configured as solid rods. In this embodiment, to provide displacement of the fluid volume, the system 10 further includes a plurality of channels 50 configured to receive and store a volume of fluid sufficient to lower float 18 and pipes 20 at the desired distance. The channels 50 are contained between the inner surface 38 and the exterior surface 36 of the housing 14 and are stationary relative to the housing 14. Openings 51 in channels 50 permit passage of fluid between the interior of housing 14 and the interior portions of the channels 50. The upper ends of the channels 50 are in flow communication with one another by means of a toroidal common flow channel 52, which in turn is coupled to the pump 34 by means of a control valve 55 which prevents undesirable fluid flow into the pump.

The inventive system 10 is efficient for several reasons including, among others, a minimal number of power-consuming components and a substantially closed fluid path. As to the former, the pump 34 (FIG. 1), configured to displace the fluid 22 through the pipes 20, is the only component of the inventive system 10 that consumes power from the external source of energy 32. To even further minimize losses associated with power consumption, the source 32 advantageously includes a solar cell. Other, more traditional sources of energy can be utilized as well.

Another feature which provides for the enhanced efficiency of the inventive system 10 relates to a combination of the housing 14 and the pipes 20 (or channels 50) cumulatively defining a closed fluid path. Regardless of the presence of the valves 42, the pipes 20 and the channels 50 are so dimensioned that when the pump 34 is in a mode characterized by withdrawing the fluid 22 from the housing 14 under the float 18, the displaced volume of fluid is stored within the pipes 20 or channels 50. As a consequence, except for minuscule unavoidable losses of the fluid 22, the volume of the latter remains substantially the same for a long period of time. Reversing the rotation of the pump 34 forces the stored volume of fluid to traverse openings 28 (FIG. 2) and into the housing 14. The openings 28 may be provided along the end portions 26 of the pipes 20 so that the axis of the openings extend transversely to the longitudinal axis A—A (FIGS. 1, 3) of the housing or, if formed on the bottom of the pipe 20, extends parallel to axis A—A. In the embodiment of the system 10 configured with the channels 50, each of the latter is provided with a respective opening 51.

To prevent damage to the pipes 20, the inner surface 38 (FIG. 3) of the housing 14 may have a stop surface provided by flange 46 (FIG. 2) dimensioned to abut and thus limit downward displacement of the float 18.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, while the present invention discloses a linearly displaceable float, it is possible to create a rotational actuator having blades and a controllable fluid-supply system providing the actuator with reciprocal rotational displacement.

What is claimed is:

1. A system for actuating a load comprising:
   a housing having an interior surface defining a chamber for containing a fluid;
   a float suspended in the chamber of the housing and operatively associated with the load such that movement of the float effects actuation of the load; and
   a fluid-supply assembly selectively delivering fluid into the housing under the float and evacuating the fluid therefrom, the float being reciprocatingly movable in the chamber in response to movement of the fluid into or out of the chamber, wherein
   (i) the fluid-supply assembly includes at least one fluid-conveying pipe operatively coupled to the load and fixedly mounted to the float to reciprocatingly move therewith away from or towards a bottom of the housing between an upper position and a lower position in response to delivering or evacuating the fluid into and out of the housing; and/or
   (ii) the housing includes a plurality of fluid-conveying channels in flow communication with each other and associated with a wall of the housing and configured to store a predetermined volume of fluid evacuated from the chamber.

2. The system of claim 1, wherein the float is made from material having a specific gravity lower than the fluid supporting the float, the fluid being incompressible.

3. The system of claim 1, wherein the fluid-supply assembly includes a plurality of fluid-conveying pipes in flow communication with each other.

4. The system of claim 1 wherein the fluid-supply assembly includes a plurality of U-shaped fluid-conveying pipes operatively coupled to the load and fixedly attached to the float, each fluid conveying pipe including a first end portion terminating outside of the housing and a second end portion terminating in the interior of the housing, the second end portion being reciprocatingly moveable between a first position relatively further from the bottom of the housing and a second position relatively closer to the bottom of the housing in response to movement of the fluid between the interior of the housing and interior portions of the fluid conveying pipes.

5. The system of claim 4, wherein the second end portions of the respective fluid conveying pipes are provided with at least one opening for permitting the passage of the fluid between the interior of the housing and the interior portions of the fluid conveying pipes, each opening being centered along a respective opening axis aligned with or traversing a longitudinal pipe axis.

6. The system of claim 4, wherein the load is configured to convert the reciprocal motion of the float into electrical energy or to actuate machinery performing a predetermined task.

7. The system of claim 4, wherein the fluid-conveying pipes are dimensioned so that cumulatively the pipes store a volume of the fluid sufficient to displace the float to the lower position.

8. The system of claim 4, further comprising a pump in fluid communication with the fluid-delivering assembly and operating in a first mode, in which the fluid is drawn into and stored within the at least one and additional fluid-conveying pipes during evacuation of the fluid and, in a second mode, in which the stored fluid is returned into the chamber.

9. The system of claim 8, further comprising a solar energy powered electrical source for powering the pump, and a controller provided with software operative to controllably switch the pump between the first and second modes.

10. The system of claim 4, wherein the upstream end of the at least one and additional fluid-conveying pipes is provided with a roller in rolling contact with an exterior surface of the housing as the fluid is delivered into and evacuated from the chamber.

11. A system for actuating a load comprising:
a housing having an interior surface defining a chamber for containing a fluid;
a float suspended in the chamber of the housing and operatively associated with the load such that movement of the float effects actuation of the load; and
a fluid-supply assembly selectively delivering fluid into the housing under the float and evacuating the fluid therefrom, the float being reciprocatingly movable in the chamber in response to movement of the fluid into or out of the chamber,
wherein the fluid-supply assembly includes at least one member coupled to the load and supported by the float to reciprocatingly move therewith away from or towards a bottom of the housing in response to delivering and evacuating the fluid into and out of the chamber, and at least one fluid-conveying channel associated with a wall of the housing and configured to store a predetermined volume of fluid evacuated from the chamber.

12. The system of claim 11, further comprising a plurality of fluid conveying channels disposed within the wall of the housing, each channel being provided with an opening in proximity to the bottom of the housing.

13. The system of claim 12, further comprising a toroidal channel providing flow communication between the plurality of fluid conveying channels, the system further including at least one pump in flow communication with the toroidal channel and operative to move at least a portion of the fluid out of the chamber into the fluid conveying channels.

14. The system of claim 4, further comprising:
a pump in fluid communication with the fluid-supply assembly to provide a negative pressure along an upper portion of each of the fluid conveying pipes sufficient to draw a predetermined volume of fluid into the fluid conveying pipes, and
at least one valve in air communication with the upper portion of the pipes, the valve opening upon turning off the pump after the predetermined volume of fluid has been stored in the fluid conveying pipes and closing upon returning the predetermined volume into the chamber.

15. The system of claim 14, further comprising a source of electrical energy charged by the load during displacement of the fluid conveying pipes during at least one downward and upward stroke, the internal source of electrical energy being electrically coupled to the pump for providing electrical energy thereto.

16. A system for activating a load comprising a fluid-actuated piston assembly suspended in a chamber defined by an inner surface of a housing and provided with a substantially closed fluid-supply path, the fluid-actuated piston assembly being configured to move reciprocatingly along a linear path within the chamber to actuate the load in response to changing a level of fluid within the housing,
wherein the system comprises at least one fluid-conveying channel and the system includes a reversible pump in flow communication with the at least one channel and operable in an evacuating mode in which a volume of fluid is displaced into the at least one channel from the housing, and a delivering mode in which the displaced volume of fluid returns into the housing, wherein said channel is provided by at least one pipe associated with the piston assembly and movable therewith, or said channel is associated with a wall of the housing.

17. The system of claim 16, wherein the piston assembly has an outer peripheral surface which is shaped complementary to the inner surface of the housing and is dimensioned so that the housing and the piston assembly are capable of moving relative to one another, and wherein the at least one channel is provided by at least one U-shaped pipe.

18. A system for activating a load comprising a fluid-actuated piston assembly suspended in a chamber defined by an inner surface of a housing and provided with a substantially closed fluid-supply path, the fluid-actuated piston assembly being configured to move reciprocatingly alone a linear path within the chamber to actuate the load in response to changing a level of fluid within the housing,
wherein the piston assembly has an outer peripheral surface which is shaped complementary to the inner surface of the housing and is dimensioned so that the housing and the piston assembly are capable of moving relative to one another,
wherein the piston assembly comprises at least one pipe and the system includes a reversible pump in flow communication with the at least one pipe and operable in an evacuating mode in which a volume of fluid is displaced into the at least one pipe from the housing, and a delivering mode in which the displaced volume of fluid returns into the housing.

19. The system of claim 18, wherein the piston assembly comprises a float to which the at least one pipe is mounted, the float having an axial opening and the housing includes an axially oriented central post slidably disposed through the opening in the float.

20. The system of claim 19, wherein the at least one pipe is U-shaped and includes a first end portion terminating outside of the housing and a second end portion terminating in the interior of the housing, the first end portion including a guide roller in rolling contact with an exterior surface of the housing.

21. The system of claim 16, wherein the load includes a converter selected from the group consisting of mechanical-to-mechanical energy converter, mechanical-to-electric energy converter and mechanical-to-heat energy converter.

22. The system of claim 16 comprising a plurality of fluid-conveying channels in flow communication with each other.

* * * * *